(12) United States Patent
Jeong et al.

(10) Patent No.: US 8,310,522 B2
(45) Date of Patent: Nov. 13, 2012

(54) METHOD FOR PHOTOGRAPHING PANORAMIC IMAGE

(75) Inventors: Young-Min Jeong, Suwon-si (KR); Sung-Dae Cho, Yongin-si (KR); Hee-Won Jung, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1134 days.

(21) Appl. No.: 11/964,064

(22) Filed: Dec. 26, 2007

(65) Prior Publication Data

US 2008/0158342 A1      Jul. 3, 2008

(30) Foreign Application Priority Data

Dec. 27, 2006  (KR) .................. 10-2006-0135213

(51) Int. Cl.
*H04N 7/00* (2011.01)
(52) U.S. Cl. ........................................... 348/36
(58) Field of Classification Search .............. 348/36
See application file for complete search history.

(56) References Cited

U.S. PATENT DOCUMENTS

| | | | |
|---|---|---|---|
| 6,717,608 B1 | 4/2004 | Mancuso et al. | 348/36 |
| 6,930,703 B1 | 8/2005 | Hubel et al. | 348/37 |
| 2004/0189849 A1 | 9/2004 | Hofer | |
| 2006/0050152 A1 | 3/2006 | Rai et al. | |
| 2006/0268129 A1 | 11/2006 | Deng | |

FOREIGN PATENT DOCUMENTS

| | | |
|---|---|---|
| EP | 0734155 | 9/1996 |
| EP | 1613060 A1 | 1/2006 |
| JP | 09-266561 | 10/1997 |
| JP | 2000-101895 | 4/2000 |
| JP | 2002-016909 | 1/2002 |
| JP | 2005-173877 | 6/2005 |
| KR | 1998-036073 | 8/1998 |
| KR | 2006-50350 | 5/2006 |

OTHER PUBLICATIONS

"Application of an Global Motion Estimation-Based Video Image Stitching in a Monitoring System;" Mar. 3, 2006; http://www.100paper.com/100paper/jisuanji/jisuanjiyingyong/2007062/16210.html.
Leng, Xiao-Yan, et al.; "Sequence Image Stitching Based on Area Feature and Cross Correlation;" Infrared & Laser Engineering; vol. 34, No. 5; Oct. 2005.

*Primary Examiner* — Robert B Harrell
(74) *Attorney, Agent, or Firm* — Cha & Reiter, LLC

(57) ABSTRACT

Disclosed is a method for photographing a panoramic image. The method includes comparing an current image input with a previous image to obtain a motion information of a corresponding photographing apparatus, when photographing respective images forming the panoramic image, recognizing a degree of movement of the corresponding photographing apparatus at least based on the obtained motion information, and photographing corresponding image by a manual input or automatically when the recognized degree of movement is satisfied with a pre-set movement distance reference.

12 Claims, 7 Drawing Sheets

METHOD FOR PHOTOGRAPHING PANORAMIC IMAGE

CLAIM OF PRIORITY

This application claims the benefit under 35 U.S.C. §119(a) of an application entitled "Method For Photographing Panoramic Image," filed in the Korean Intellectual Property Office on Dec. 27, 2006 and assigned Serial No. 2006-135213, the contents of which are hereby incorporated by reference.

BACKGROUND OF THE INVENTION

1. Field of the Invention

The present invention relates to digital image photography in apparatuses, including digital cameras as well as mobile terminals equipped with camera modules, and more particularly to a method for photographing a panoramic image.

2. Description of the Related Art

Conventionally, an image capture unit in a digital image photographing apparatus can obtain an image formed within a focal length of a lens thereof. Here, the obtained image is within a range of the viewing angle (between about 30° to 50° for general cameras), which is smaller than the human visual angle (between about 150° to 200°). There is a conventional method of photographing multiple images while properly changing the viewing angle, and inter-connecting the photographed images in sequence to reorganize them into one consecutive image. Thus, one can obtain a picture with a viewing angle similar to or larger than the human visual angle. This method is called a panoramic image photographing method.

In a panoramic image photographing mode, the conventional digital image photographing apparatus photographs several images that are inter-connected horizontally or vertically and then stores them in a memory. The images stored in the memory are provided to an appropriate interior/exterior image processor later, and are inter-connected into one consecutive image. In order to eliminate color differences and image discords at the boundaries between the images, digital image photographing apparatuses photograph multiple images with sufficient overlap between their boundaries, and then align the images by adjusting their boundaries. Thereafter, they perform image processing, including stitching and bending. Through this process, a single image including naturally inter-connected multiple images is obtained.

Alignment accuracy is a high priority in photographing a panoramic image. To this end, an accessory apparatus, such as a tripod, is usually used in manual photographing by a user. Recently, a method has been suggested in which a corresponding photographing apparatus is mounted on a tripod or the like, and the mounted photographing apparatus is rotated according to respective images in panorama photographing. An example of such the method is disclosed in Korean Patent Application No. 2003-0052444 filed on Jul. 29, 2003, entitled "Camera And Method for Photographing Panorama Picture" filed by Samsung Techwin Co. Ltd., and the inventor is BAE, Sung-cheol. Further to the above-described methods, an apparatus that can detect rotation angle may be additionally mounted on the corresponding photographing apparatus. A user sets the rotation angle of the photographing apparatus in advance. Therefore, the respective images are photographed by rotational displacement over the rotation angle of the photographing apparatus pre-set by the user in panorama photographing. This method has been also suggested.

Furthermore, in order to align the respective images more accurately when photographing panoramic images without a mounting accessory or additional hardware on the corresponding photographing apparatus, another method has been proposed. The method provided uses the partial region of the border of previously photographed image is represented appropriately overlapping with the current image for photographing when photographing respective images. Thus, the user can control an appropriate position for photographing by adjusting the pre-photographed image with the current photographing image. An example of such the method is disclosed in US Publication No. 2004/0189849 filed on Mar. 31, 2003, entitled "Panoramic Sequence Guide" in the name of an inventor, Gregory V. Hofer.

Photographing the panoramic image requires more user's sophistication and proficiency vis-a-vis photographing a general single image. This has necessitated better and more convenient solutions for manipulating and photographing images.

SUMMARY OF THE INVENTION

Accordingly, the present invention has been made to solve the above-mentioned problems occurring in the prior art. The present invention provides a method for photographing a panoramic image, in which a user can manipulate a photographing apparatus more easily and photograph the panoramic image more accurately without additional apparatus and hardware.

In accordance with an aspect of the present invention, there is provided a method for photographing a panoramic image, the method including the steps of: comparing a current image input, for example in real time, with a previous image to obtain motion information of a corresponding photographing apparatus when photographing respective images forming the panoramic image, recognizing a degree of movement of the corresponding photographing apparatus at least based on the obtained motion information, and photographing the corresponding image by a manual input or automatically when the recognized degree of movement is satisfied with a pre-set movement distance reference.

BRIEF DESCRIPTION OF THE DRAWINGS

The present invention will be more apparent from the following detailed description taken in conjunction with the accompanying drawings, in which.

DETAILED DESCRIPTION OF THE INVENTION

Hereinafter, one exemplary embodiment according to the present invention will be described with reference to the accompanying drawings. In the description below, many particular items such as a detailed component apparatus are shown, but these are given only for providing the general understanding of the present invention, it will be understood by those skilled in the art that the present invention.

Figure 1:
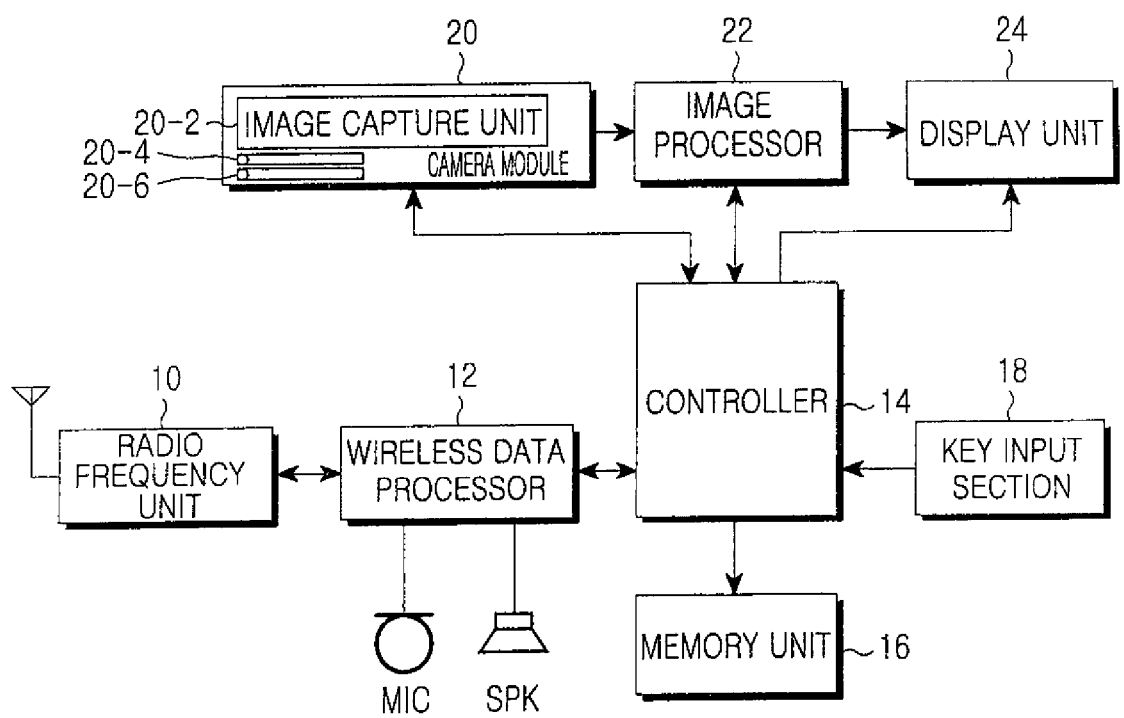
FIG. 1 is a block diagram illustrating a mobile terminal according to the present invention.

FIG. 1 is a block diagram of a mobile terminal according to the present invention. Diverse apparatuses have digital image photography functionality, a hardware-based apparatus will be described first with an example of the mobile terminal as shown in FIG. 1.

Referring to FIG. 1, the mobile terminal having digital image photography functionality according to the present invention includes a camera 20, an image processor 22, a display unit 24, as well as a controller 14, a memory unit 16, a key input section 18, a Radio Frequency (RF) unit 10, and a wireless data processor 12.

The RF unit 10 modulates user voice, text messages and control data into wireless signals. Transmits the modulated signals to a base station (not shown) of a mobile radio communications network. Receives the wireless signals from the base station. Then the RF unit 10 demodulates the signals into a voice, text messages, control data or the like, to output. The wireless data processor 12 decodes voice data received from the RF unit 10 under the control of the controller 14 to output an audible sound via a speaker. It also digitalizes the user voice signal input from a microphone to output to the RF unit 10, and supplies text messages and control data input via the RF unit 10 to the controller 14.

The camera 20 performs a general digital camera function under the control of the controller 14, and photographs visible rays input from the external photographing subject. The camera 20 includes the image capture unit 20-2 formed with a charge-couple device (CCD) photographing device or the like, as well as a luminance sensor 20-4 for measuring luminance and a distance sensor 20-6 for measuring a focal distance from a subject or the like. The image processor 22 processes image data output to the camera 20 to convert the processed data into digital image data of a sufficient format.

The key input section 18 for receiving a telephone number or text messages from the user includes a plurality of keys for inputting numbers and text message information and a plurality of function keys for setting diverse functions, and outputs their input signals to the controller 14. The display unit 24 can be formed with the display devices, such as a liquid crystal display (LCD) or the like, and displays photographed digital image data including the messages corresponding to various operating state of the corresponding mobile terminal under the control of the controller 14.

The controller 14 controls the general operation of a mobile communications terminal through general control of the respective function units. That is, the controller 14 performs a process according to the number and menu selecting signals input via the key input section 18, receives an external photographing signal via the camera 20 to process correspondingly, and outputs the images photographed by the camera as well as the image output signals necessary for diverse operations through the display unit 24. The controller 14 brings content for output stored in the memory unit 16 or stores the content in the memory unit 16. The memory unit 16 stores a plurality of programs and data related to the operation of the controller 14. The memory unit 16 is used for storing information required for manipulating the mobile terminal and camera photographing image information.

The mobile terminal equipped with these configurations performs a function of the camera as well as operations relating to conventional mobile communications services. The controller 14 performs the operation of panoramic image photography according to characteristics of the present invention as well. Further, the memory unit 16 stores the operating program and relative information for the operation of panoramic image photography in the controller 14. It outputs the corresponding information to the controller 16 where necessary, according to the present invention.

The mobile terminal compares the current input image with the previous image to obtain the motion information of the corresponding mobile terminal and recognizes the direction of motion and the degree of movement. This is required, for example, when the mobile terminal according to the present invention receives the image of the subject like a moving picture in real-time, and is moved by the user according to the photographing direction of the panoramic image or by an additional apparatus equipped with the corresponding the mobile terminal and rotates automatically as well in case of photographing the panoramic image. In this manner the image corresponding to the sequential images for creating an adequate panoramic image is obtained. Hereinafter, the operations of panoramic photographing according to embodiments of the present invention will be described with reference to accompanying drawings.

Figure 2:
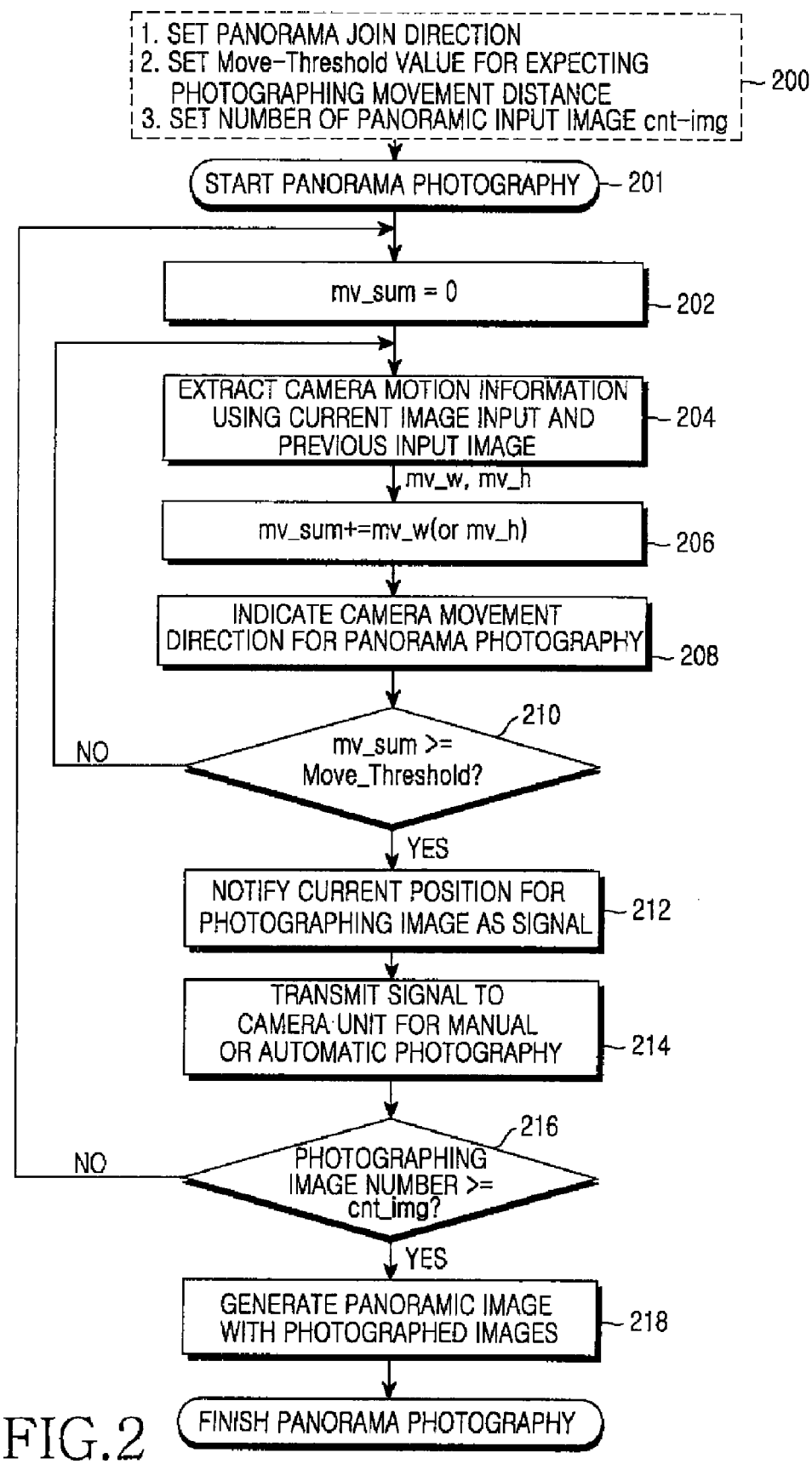
FIG. 2 is a flow diagram illustrating an operation of photographing a panoramic image according to an embodiment of the present invention.
Figure 3:
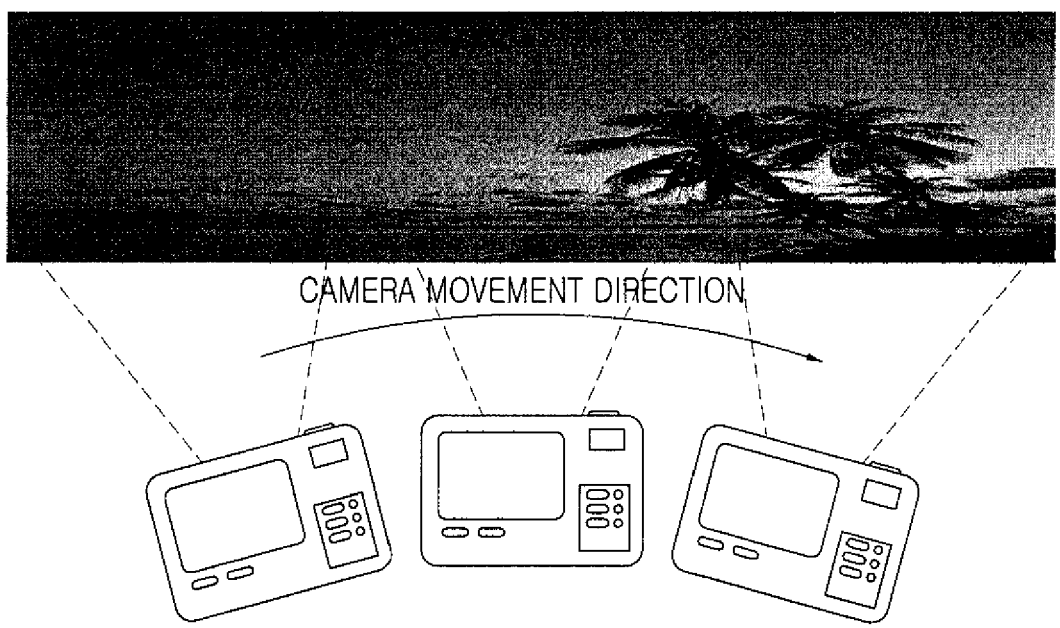
FIG. 3 illustrates an example of a movement state of a camera when photographing a panoramic image.

FIG. 2 is a flow diagram for illustrating the operation of photographing a panoramic image according to an exemplary embodiment of the present invention. Referring to FIG. 2, an environment for photographing the panoramic image is set in step 200, which occurs prior to actual panoramic image photography. In step 200, an inter-connecting photographing direction is set, for example, in the direction to the above, below, left, and right of the respective images forming the panoramic image. In addition, movement distance reference information (variable Move-Threshold value), which is indicated as the movement distance value of the photographing apparatus, is set as a reference value for recognizing the photographing point. This is used to set a photographing point of the respective images of the panoramic image. Furthermore, the number of photographing images (variable cnt_img) which will be inter-connected for forming the panoramic image are set.

The setting operation of the panoramic image photographing environment according to step 200 can be executed as a selection (e.g., a panoramic image photographing environment setting mode of the sub-menus of the camera photographing menu for setting diverse functions in the conventional mobile terminal to receive the respective environment setting value from the user). The configurations and operating programs for displaying the corresponding menus for selecting operation and confirming a key input to the key input section are provided to the mobile terminal in advance from the user. In addition, some or all of the respective panoramic image photographing environment modes set by the user in step 200 can be fixed as a value adequately set by a developer to provide the user.

Thereafter, in step 201, the user can select a panoramic image photographing mode from among sub-menus of the camera photographing menu of the mobile terminal. Thereafter start to photograph the panoramic image by photographing a first image in the panoramic image. The first image of the panoramic image is stored by a shutter input of the user, which is a method similar to that of conventional photography. Subsequent image photography will be performed based on the panoramic image photographing method according to an exemplary embodiment of the present invention. When the panoramic image photography is started, an image input to the photographing apparatus in real time from the viewpoint is input and stored in the memory. Then the movement information of the photographing apparatus using the stored image is obtained. In step 202, a movement distance variable mv_sum for recognizing the degree of movement of the photographing apparatus is initialized to zero.

In step 204, the movement of the photographing apparatus (i.e., the camera) is detected using the current input image and the previous input image. As shown in FIG. 2, in step 204, when the direction of panoramic image photography is rightward, the user should make the camera move rightward. The image input to the camera is input like a moving picture. Motion information variables, mv_w and mv_h, are extracted by comparing the previous image information (previous frame) with the current image information (current frame).

Figure 4A:
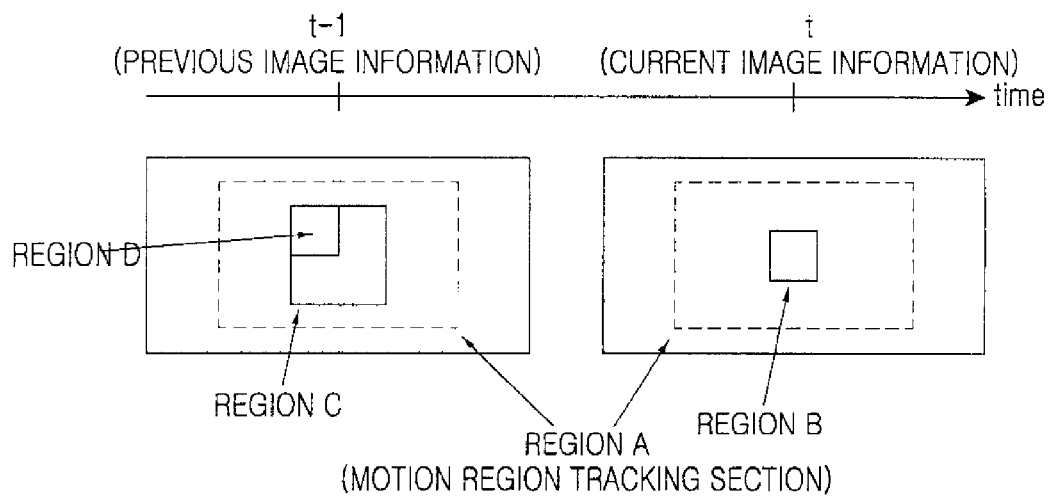
FIGS. 4A and 4B illustrate a compare scheme between images when photographing a panoramic image according to an embodiment of the present invention.
Figure 4B:
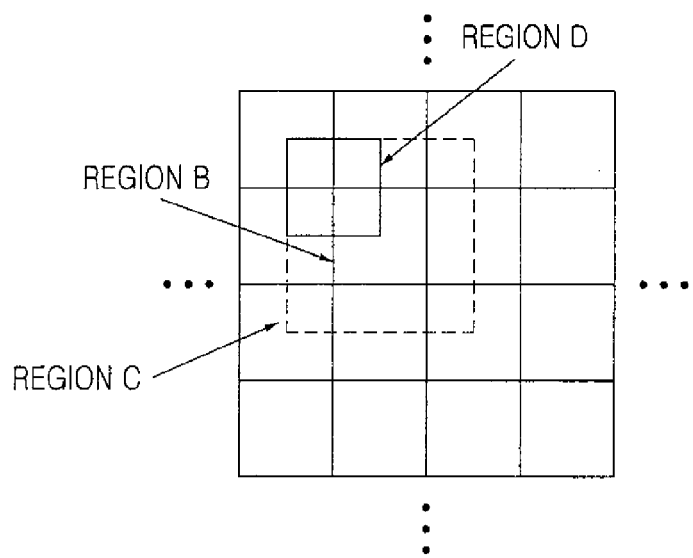

The method of extracting motion information in step 204 will be described in more detail with reference to FIGS. 4A, 4B and 5. FIGS. 4A and 4B illustrate first necessary regions in the image frame in order to obtain motion information of the photographing apparatus. According to the present invention, in order to obtain the camera movement information from the current image (frame) and previous image (frame) in time sequence, (1) the range sufficiently set in overall frame regions is set for a motion region tracking section (Region A), and (2) the image included in the motion region tracking section (Region A) of the current frame is compared with the previous frame to obtain the motion information. At least one or more pixel blocks (usually multiple pixels) with adequate size, e.g., 100 pixel (10×10) block or 400 (20×20) pixel block (Region B), is set in the corresponding motion region tracking section (Region A). The pixel blocks are set to detect a plurality of pixel blocks of the previous frame which are identical or most similar to the respective pixel blocks (e.g., Region D). Then the motion information is obtained using the degree of relative position variable (e.g., motion vector) between the respective corresponding pixel blocks. The method of comparing the pixel blocks with the adequate size between the current frame and the previous frame, and through which the method obtains the motion information may be similar to the method used in conventional motion estimation and motion compensation technique when encoding and decoding the moving pictures.

When the motion region tracking section (Region A) in the current frame is set, the whole region of the frame can be set for the motion tracking section. However, as shown in FIG. 4A, the reason why the motion tracking range is selected within the sufficient region of central portions in the input image, not within the whole image, is that there is more likely no image information corresponding to the previous image in an edge region of the input image. In the edge region the possibility of causing error factors in obtaining accurate motion information is high.

In addition, inconsecutive pixel blocks in an arbitrary position can be set for a plurality of pixel blocks with the adequate size in the motion region tracking section (Region A). As shown in FIG. 5, the whole motion region tracking section (Region A) is divided into multiple sub-regions, and the respective sub-regions can be set for the pixel block.

When the pixel block of the previous frame, which is identical or most similar to the respective pixel blocks, is detected, the method of comparing pixel blocks in the whole regions of the previous frame or the like may be used. However, for simplification of calculation amount and speedy calculation, a searching region (Region C) having a sufficient range in the above and below, left and right centering on the each pixel blocks can be set. The respective pixel blocks of the current frame have the searching region (e.g., region) corresponding to their own pixel blocks in the previous frame, and compare the pixel blocks with the size equivalent to the corresponding searching region to detect the most similar pixel block. Thereafter, the relative position value one another is used for motion information.

Figure 5:
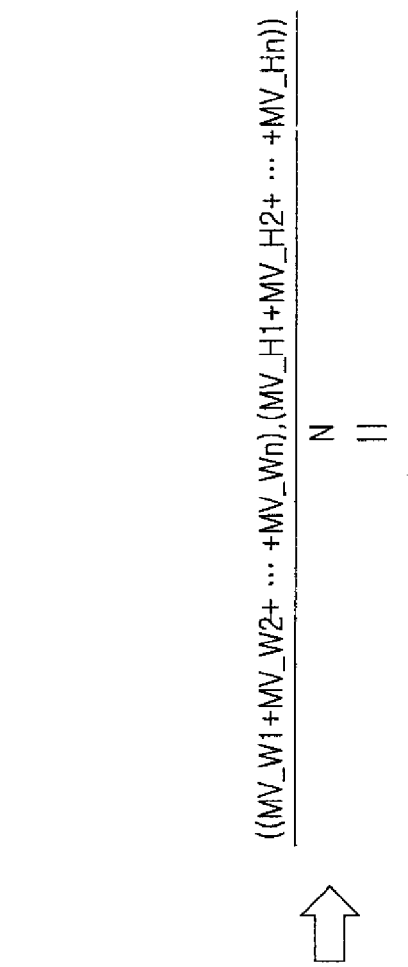
FIG. 5 illustrates a dividing scheme of a pixel block in a comparing region of an image frame and motion information detecting scheme in order to compare images to one another when photographing a panoramic image according to an embodiment of the present invention.

Referring to FIG. 5, the motion information on the respective pixel blocks can be indicated as [mv_w1, mv_h1], [mv_w2, mv_h2], . . . and [mv_wn, mv_hn]. After adding up these motion information and dividing them by the number (N) of the corresponding pixel block (i.e., calculating an average of all motion information) the variables mv_w and mv_h for camera movement information of the current viewpoint can be obtained. Herein, the variable mv_w is a horizontal motion vector, and the variable mv_h is a vertical motion vector. These variables can be negative or positive numbers and their absolute value becomes great based on the degree of motion.

An example of a detailed program code for detecting the movement direction using the horizontal motion vector mv_w and vertical motion vector mv_h is below in Table 1.

TABLE 1

```
if(mv_w > 0) {
    if(mv_h > 0) direction = 8;
    else if(mv_h < 0) direction = 3;
    else direction = 5;
}
else if(mv_w < 0) {
    if(mv_h > 0) direction = 6;
    else if(mv_h < 0) direction = 1;
    else direction = 4;
}
else {
    if(mv_h > 0) direction = 7;
    else if(mv_h < 0) direction = 2;
    else direction = 0;
}
```

Figure 6:
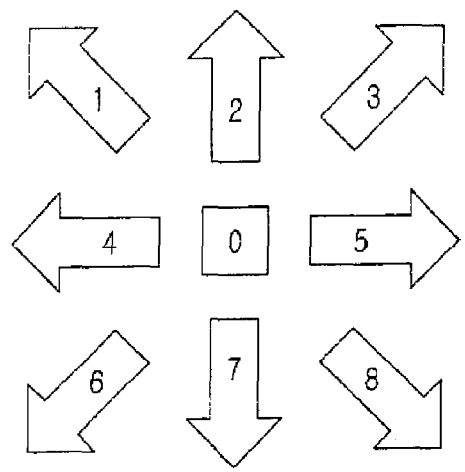
FIG. 6 illustrates an indicating state of the direction of motion of a photographing apparatus detected when photographing a panoramic image according to an embodiment of the present invention.

Hereinafter, the program code will he described with reference to FIG. 6. First, when the horizontal motion vector mv_w is greater than the horizontal recognizing reference value, e.g., 0, (i.e., when the photographing apparatus moves rightward) the vertical motion vector mv_h is confirmed whether greater than the vertical recognizing reference value, e.g. 0, or not, (i.e., confirming the photographing apparatus moves downward). Then the movement direction is set to Direction 8 (right-downward in FIG. 6). When the vertical motion vector mv_h is less than 0, the movement direction is set to Direction 3 (right-upward), and when the vertical motion vector mv_h is 0, the movement direction is set to Direction 5 (rightward).

In addition, the horizontal motion vector mv_w is less than 0, the movement direction is set to Direction 6 (left-downward) or Direction 1 (left-upward) according to whether the vertical motion vector mv_h is greater than 0 or not, and when the vertical motion vector mv_h is 0, the movement direction is set to Direction 4 (leftward).

Besides, the horizontal motion vector mv_w is 0, the movement direction is set to Direction 7 (downward) or Direction 2 (upward) according to the vertical motion vector mv_h.

When the vertical motion vector mv_h is also 0, the movement direction is set to Direction 0 (stop state).

Accordingly, the movement direction of the current photographing apparatus can be recognized using the horizontal or vertical motion vector. The number of indicates the respective movement directions and their meanings can be arbitrary set in accordance with the program code design.

Referring to FIG. 2 again, step 204 in which the camera motion information is extracted using the current input image and the previous input image is performed through the operations shown in FIGS. 3 through 6. Then the movement distance is measured in step 206. For example, when the movement direction is changed from left to rightward, the movement distance variable mv_sum is obtained by accumulating the value of the horizontal motion vector mv_w and the movement direction is above, the movement distance variable mv_sum is obtained by accumulating the value of the vertical motion vector mv_h.

In step 208, according to the movement direction obtained in step 204, the movement direction of the photographing apparatus (i.e., the camera) for panoramic image photographing is notified to the user via an appropriate user interface (UI). he direction toward which the user move the current camera can be indicated in the display unit with proper icon or the like.

Figure 7A:
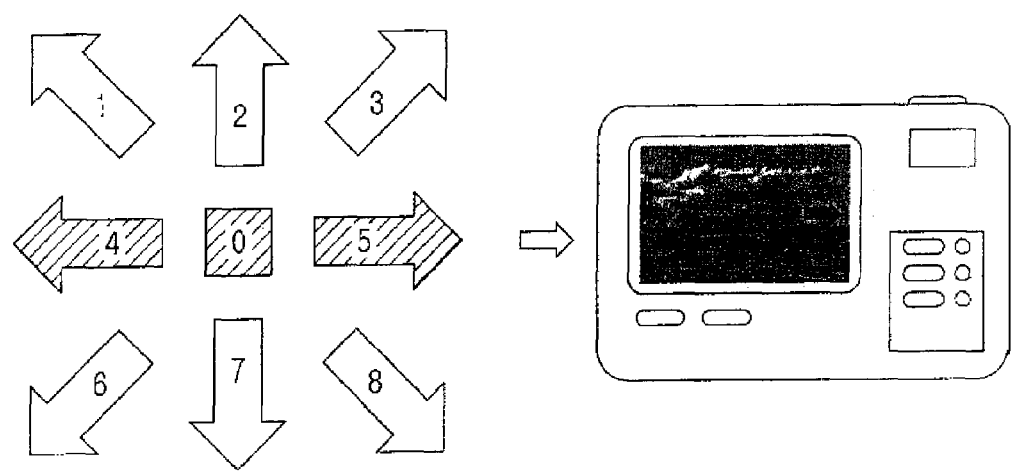
FIGS. 7A, 7B and 7C are examples of preview images on a screen for guiding the photographing direction according to the movement direction of a photographing apparatus when photographing a panoramic image according to an embodiment of the present invention.
Figure 7B:
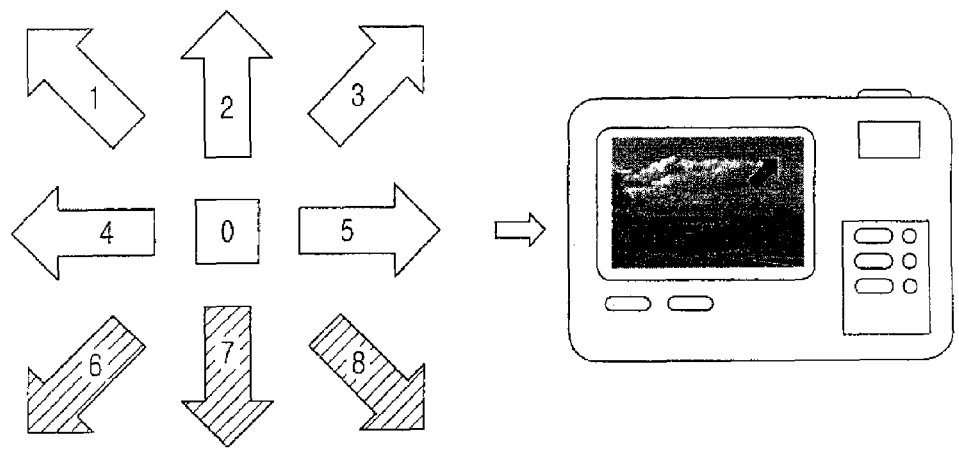
Figure 7C:
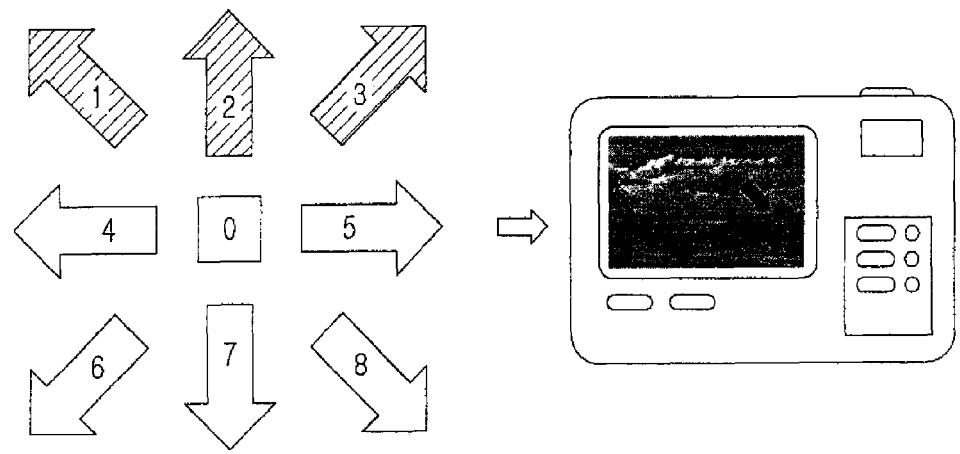

The operations of step 208 will be described in detail with reference to accompanying drawings of FIGS. 7A, 7B and 7C. FIGS. 7A, 7B and 7C are examples of preview images for guiding the photographing direction according to the movement direction of the photographing apparatus when photographing the panoramic image according to an exemplary embodiment of the present invention. For example, they illustrate when the panoramic image is photographed from the left to the rightward.

As shown in FIG. 7A, when the camera movement toward Direction 4, 0 or 5 (leftward, stop and rightward) is detected, an arrow icon in the direction of the right can be displayed on the preview screen for guiding the camera movement toward the direction for correct panoramic image photography. In addition, as shown in FIG. 7B, when the camera movement toward Direction 6, 7 or 8 (left-downward, downward and right-downward) is detected, an arrow icon in the direction of the right-above can be displayed on the preview screen for guiding the camera movement toward in the direction for correct panoramic image photography. Furthermore, as shown in FIG. 7C, the camera movement toward Direction 1, 2 or 3 (left-upward, upward and right-upward), is detected, an arrow icon in the right-below can be displayed on the preview screen for guiding the camera movement toward the direction for correct panoramic image photographing.

As shown in FIGS. 7A, 7b and 7C, the camera movement direction for panorama photographing is displayed in step 208. Then in step 210, the movement distance mv_sum is compared with the movement distance reference information move threshold pre-set in step 200. When the compared result in step 210 is not up to the movement distance reference information move_threshold (i.e., the camera has not been moved the adequate distance yet) it returns to step 204 and its operation is repeated again. When the compared result in step 210 is up to the movement distance reference information move_threshold, and then it proceeds to step 212.

In step 212, it can be notified to the user that the current position is for photographing the image via an appropriate UI. In step 214, based on the pre-set photographing mode, e.g., panoramic image manual photographing mode or panoramic image automatic photographing mode, the photographing image is performed by a shutter input of the user or automatically. Of course, the manual or automatic panoramic image photographing mode can be set along with when setting the panoramic image photographing environment illustrated in step 200.

In step 214, having recognized whether the number of currently photographed images is up to the number of the image cnt_img pre-set in step 200 or not, if it is not, step 202 is proceeded again and its operation is repeated. However, if it is, step 218 is proceeded. In step 218, a single one panoramic image is created through inter-connecting the photographed images. In step 218, in order to inter-connect the multiple images naturally, the image processing methods, such as a common image aligning, stitching and blending methods, can be applied.

In the detailed description of photographing the panoramic image, the photographing apparatus according to the present invention being moved by the user is described as an exemplary embodiment. However, the present invention also can be can be mounted on an accessory moving apparatus to move automatically, Further, the direction of the panoramic image photography is described as the horizontal or vertical direction when photographing the panoramic image, however, the present invention can be applied where the horizontal and vertical directions of photographing direction of the panoramic image are mixed, i.e., when a plurality of images forming the panoramic image are arranged in mosaic-shape horizontally and vertically. Furthermore, the diverse UIs can be variously implemented and are not limited to the present embodiments.

As described above, the motion information of the terminal mounted with the camera is detected through the operation of image process when photographing panoramic image according to the present invention. The direction of camera movement by the user can be guided to move toward the direction of panoramic image photographing in such a manner that the user can photograph the panoramic image more easily and accurately without mounting an additional apparatus and hardware.

While the invention has been shown and described with reference to certain exemplary embodiments thereof it will be understood by those skilled in the art that various changes in form and details may be made therein without departing from the spirit and scope of the invention as defined by the appended claims.

What is claimed is:

1. A method for photographing a panoramic image, operable within an image processor of a digital photographing apparatus, the method comprising the steps of:

comparing a current image input with a previous image to obtain motion information of a corresponding photographing apparatus when photographing respective images forming the panoramic image;

recognizing a degree of movement and a direction of motion of the corresponding photographing apparatus at least based on the obtained motion information in which horizontal motion vector information and vertical motion vector motion information of at least one or more pixel blocks are averaged respectively;

photographing a corresponding image by a manual input, or automatically when the recognized degree of movement satisfies a pre-set movement distance reference; and operating a user interface to guide the movement of the corresponding photographing apparatus from the recognized direction of motion to the pre-set direction for panoramic image photography.

2. The method as claimed in claim 1, wherein the comparing a current image input with a previous image is in real time.

3. The method as claimed in claim 2, wherein, in the step of comparing the current image input in real time with a previous image, a pre-set range in the entire region of the current frame is set for a motion region tracking section, and an image included in the motion region tracking section is compared with the previous frame to obtain the motion information; and said at least one or more pixel blocks with the size pre-set in the motion region tracking section are set, a plurality of pixel blocks corresponding to the previous frame which is most similar to the corresponding pixel block is detected, and the motion information using degrees of relative position variables between the corresponding pixel blocks is obtained.

4. The method as claimed in claim 3, wherein the motion region tracking section is set to be exclusive of an edge portion of the frame.

5. The method as claimed in claim 3, wherein, when detecting the pixel blocks corresponding to the previous frame which is most similar to the pixel block in the motion region tracking section of the current frame, a corresponding pixel block at a search region of the corresponding position having the pre-set range centering on the pixel block of the current frame in the previous frame is detected.

6. The method as claimed in claim 3, wherein, when the pixel blocks set in the motion region tracking section of the current frame are multiple number, the motion information is obtained with putting together the degrees of relative position variables of the respective pixel blocks.

7. A method for photographing a panoramic image, operable within an image processor of a digital photographing apparatus, the method comprising the steps of:

comparing a current image input with a previous image to obtain motion information of a corresponding photographing apparatus when photographing respective images forming the panoramic image;

recognizing a direction of motion and a degree of movement of the corresponding photographing apparatus at least based on the obtained motion information in which horizontal motion vector information and vertical motion vector motion information of at least one or more pixel blocks are averaged respectively; and operating a user interface to guide movement of the corresponding photographing apparatus from the recognized direction of motion to the pre-set direction for panoramic image photography.

8. The method as claimed in claim 7, wherein the comparing a current image input with a previous image is in real time.

9. The method as claimed in claim 8, wherein, in the step of comparing the current image input in real time with a previous image, a preset range in the entire region of the current frame is set for a motion region tracking section, and an image included in the motion region tracking section is compared with the previous frame to obtain the motion information; and said at least one pixel block of said one or more pixel blocks with the size pre-set in the motion region tracking section is set, a plurality of pixel blocks corresponding to the previous frame which is most similar to the corresponding pixel block is detected, and the motion information using degrees of relative position variables between the corresponding pixel blocks is obtained.

10. The method as claimed in claim 8, wherein the motion region tracking section is set to be exclusive of an edge portion of the frame.

11. The method as claimed in claim 8, wherein, when detecting the pixel blocks corresponding to the previous frame which is most similar to the pixel block in the motion region tracking section of the current frame, a corresponding pixel block at a search region of the corresponding position having a pre-set range centering on the pixel block of the current frame in the previous frame is detected.

12. The method as claimed in claims 8, wherein, when the pixel blocks set in the motion region tracking section of the current frame are a multiple number, the motion information is obtained with putting together the degrees of relative position variables of the respective pixel blocks.

* * * * *